United States Patent [19]
Hayashi

[11] Patent Number: 6,101,318
[45] Date of Patent: Aug. 8, 2000

[54] OUTPUT APPARATUS FOR SETTING THE OUTPUT ENVIRONMENT

[75] Inventor: Masao Hayashi, Tokyo, Japan

[73] Assignee: Canon Kabushiki Kaisha, Tokyo, Japan

[21] Appl. No.: 08/015,831

[22] Filed: Feb. 10, 1993

[30]     Foreign Application Priority Data

Feb. 14, 1992   [JP]   Japan ................................. 4-028481

[51] Int. Cl.⁷ ................................................ G06F 15/00
[52] U.S. Cl. ........................................ 395/115; 395/113
[58] Field of Search .................................. 395/102, 109,
395/110, 112, 114, 115, 149, 148, 200.3,
200.35, 200.42, 570; 358/445, 467, 538,
539, 437; 345/435, 433, 436, 467; 382/173,
175, 176, 178, 180, 182, 184

[56]                References Cited

U.S. PATENT DOCUMENTS

| | | | |
|---|---|---|---|
| 4,826,333 | 5/1989 | Tanaka | 400/76 |
| 4,849,614 | 7/1989 | Watanabe et al. | 235/379 |
| 5,047,957 | 9/1991 | Ikenoue | 364/519 |
| 5,075,874 | 12/1991 | Steeves et al. | 392/112 |
| 5,091,868 | 2/1992 | Picuens et al. | 395/148 |
| 5,165,014 | 11/1992 | Vassar | 395/112 |
| 5,268,993 | 12/1993 | Ikenoue et al. | 395/114 |
| 5,353,388 | 10/1994 | Motoyama | 395/117 |
| 5,563,999 | 10/1996 | Yausich et al. | 395/149 |

FOREIGN PATENT DOCUMENTS

| | | |
|---|---|---|
| 0332779A3 | 9/1989 | European Pat. Off. . |
| 0395090A3 | 10/1990 | European Pat. Off. . |
| 2211971A | 7/1989 | United Kingdom . |

*Primary Examiner*—Scott Rogers
*Assistant Examiner*—Gabriel I. Garcia
*Attorney, Agent, or Firm*—Fitzpatrick, Cella, Harper & Scinto

[57]                ABSTRACT

An output apparatus includes a memory for storing output environment setting information for setting information designating an output environment, from among plural possible output environments, a registration unit for registering the output environment setting information in the memory, a read-out unit for reading out desired output environment setting information from the memory and an output environment setting unit for setting an output environment on the basis of the output environment setting information read out by the read-out unit.

28 Claims, 6 Drawing Sheets

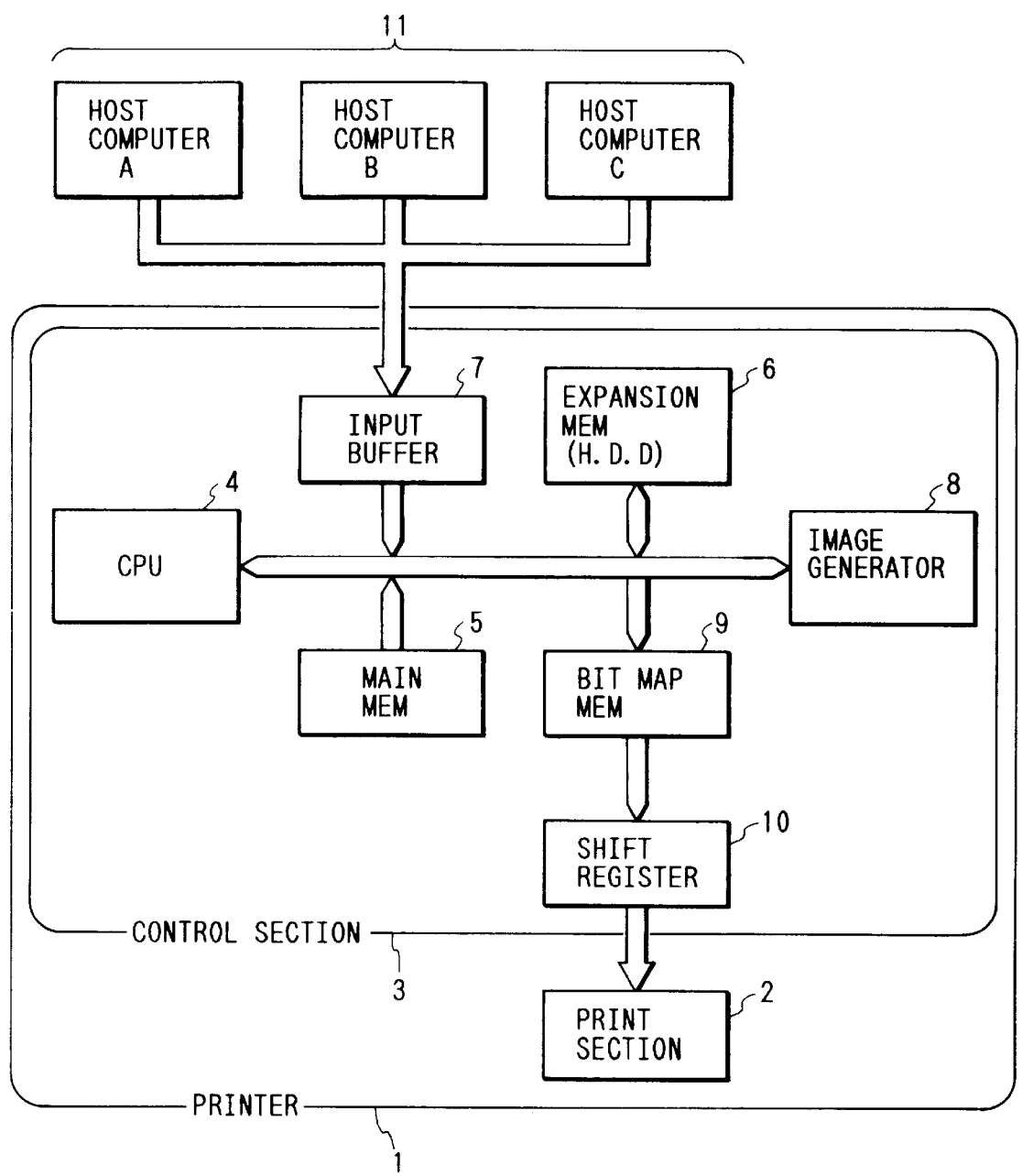

EXPANSION MEM
MEM MAP 12

OUTPUT APPARATUS FOR SETTING THE OUTPUT ENVIRONMENT

BACKGROUND OF THE INVENTION

1. Field of the Invention

The present invention relates to an output method and apparatus having a function of setting an output environment.

2. Related Background Art

As printers in which overlay forms, character pattern information, and the like can be registered, for example, laser beam printers, and the like are known. Conventionally, in a printer of this type, when character fonts which are not built in the printer, or overlay forms (e.g., frames, ruled lines, logograms, and the like), which are frequently used by a user, are to be registered, or when an emulation program for realizing another print protocol is to be added, a card comprising a programmable memory element such as an EPROM, or an expansion memory, which is available in the form of a printed circuit board, is used.

Normally, such a printer is used in common by a plurality of host computers (shared use).

As described above, when a plurality of users share a single printer, and use different character fonts, overlay forms, and the like, all these character fonts and overlay forms must be registered in the printer in advance. In this case, since the expansion memory using a programmable memory such as an EPROM has a small memory capacity, a large number of character fonts and overlay forms cannot be simultaneously registered. For this reason, the users must individually possess such expansion memories, and must replace the expansion memory when they use the printer. Such operations are troublesome for the users. In particular, when the host computers and the printer are coupled through, e.g., a network, such troubles are made still worse.

Furthermore, when the plurality of users share the single printer, as described above, if they register the formats of approval stamps or important documents, such formats may be freely used by other users.

SUMMARY OF THE INVENTION

It is an object of the present invention to provide an output method and apparatus, which can immediately realize a desired output environment, and particularly a desired overlay form, when a user uses an output apparatus, and can eliminate troublesome operations upon changing of setting of the output apparatus.

It is another aspect of the present invention to provide an output apparatus having a function of setting various output environments, comprising memory means for storing environment setting information for setting the output environment registration means for registering the output environment setting information in the memory means, read-out means for reading out the desired output environment setting information from the memory means, and output environment setting means for setting an output environment on the basis of the output environment setting information read out by the read-out means.

It is another aspect of the present invention to provide an output apparatus having a function of setting various output environments, comprising memory means for storing output environment setting information for setting the output environment together with a pass code set by a user, registration means for registering the output environment setting information and the pass code in the memory means, read-out means for, when the pass code is designated, reading out the desired output environment setting information from the memory means, and output environment setting means for setting an output environment on the basis of the output environment setting information read out by the read-out means.

It is another aspect of the present invention to provide an output method with which a user registers output environment setting information including, e.g., character fonts, overlay forms, emulation programs, and the like in a memory in an output apparatus in units of users, and selects desired information of the output environment setting information upon execution of an output operation, so that the output operation can be executed in a desired output environment, the output environment setting information can be registered by a user, and various output environments used when a user uses the output apparatus can be prepared by the output apparatus side.

BRIEF DESCRIPTION OF THE DRAWINGS

FIG. 2 is a block diagram of the laser beam printer of the first embodiment;

DETAILED DESCRIPTION OF THE PREFERRED EMBODIMENTS

The preferred embodiments of the present invention will be described hereinafter with reference to the accompanying drawings.

Note that "output environment setting information" is a general name for various kinds of information (emulation program, character fonts, overlay forms, and the like) which are required upon execution of an output operation in an output apparatus. Therefore, the output environment setting information includes both multipurpose information prepared in advance in the output apparatus, and user information prepared by a user himself or herself.

Note that an "output environment" refers to a group of some pieces of output environment setting information necessary for setting a predetermined output environment of the output apparatus.

First Embodiment

Figure 1:
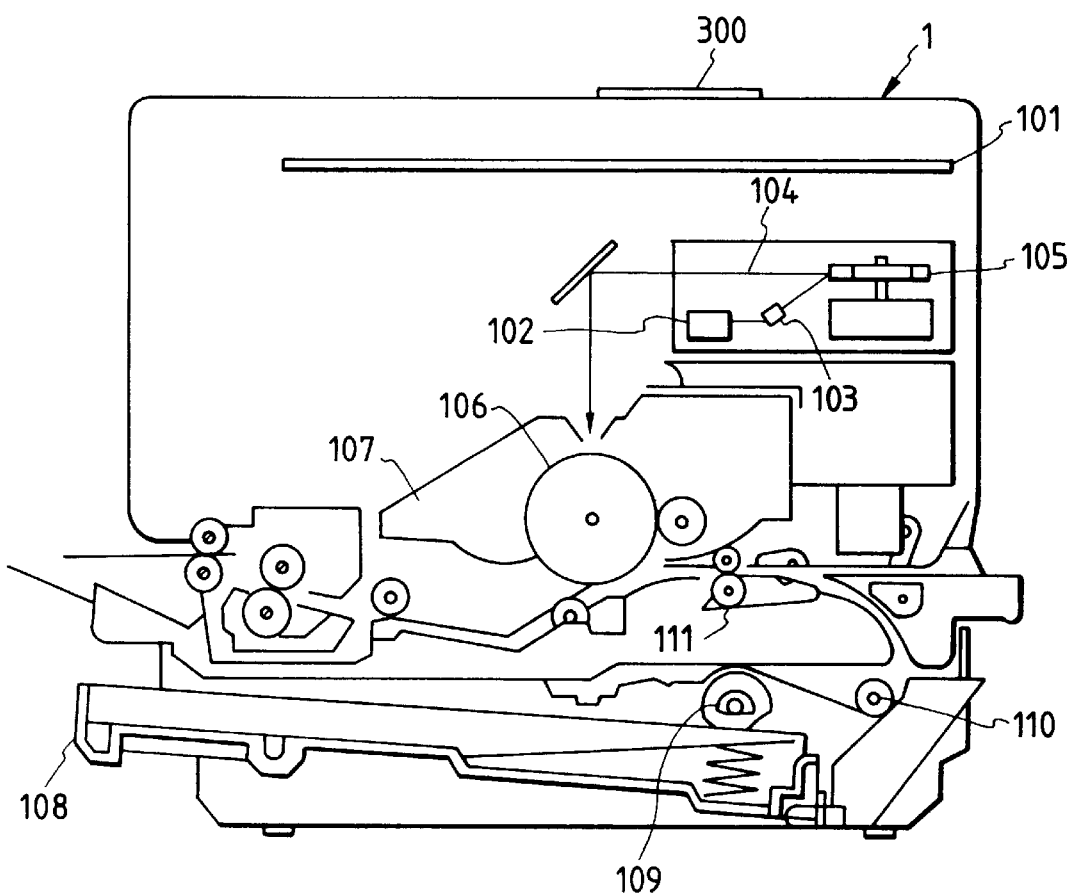
FIG. 1 is a sectional view showing an internal structure of a laser beam printer according to the first embodiment of the present invention.

FIG. 1 is a sectional view showing an internal structure of a laser beam printer of this embodiment. This laser beam printer allows registration of character patterns, form data, and the like from a data source (not shown).

Referring to FIG. 1, a laser beam printer main body 1 receives and stores print information (character codes, the like), form information, macro commands, or the like supplied from an externally connected host computer, and generates corresponding character patterns, form patterns, and the like according to these pieces of information, thereby forming an image on a recording sheet as a recording medium. The laser beam printer 1 comprises an operation panel 300 provided with operation switches, LED indicators, and the like, and a printer control unit 101 for controlling the entire laser beam printer 1, and analyzing character information, and the like supplied from the host computer. Mainly, the printer control unit 101 converts character information into a video signal of a corresponding character pattern, and outputs the video signal to a laser driver 102.

The laser driver 102 is a circuit for driving a semiconductor laser 103, and ON/OFF-controls a laser beam 104 emitted from the semiconductor laser 103 according to the input video signal. The laser beam 104 is scanned by a rotary polygonal mirror 105 in the horizontal direction to expose an electrostatic latent image of a character pattern is formed on the electrostatic drum 106. The latent image is developed by a developing unit 107 arranged around the electrostatic drum 106, and the toner image is transferred onto a recording sheet. A cut recording sheet is stored in a sheet cassette 108 loaded in the laser beam printer 1. The recording sheet is picked up into the printer by a paper feed roller 109, and is fed to the electrostatic drum 106 by convey rollers 110 and 111.

FIG. 2 is a block diagram of the laser beam printer according to the first embodiment. In FIG. 2, the laser beam printer main body 1 is constituted by a print section 2 for actually printing an image, and a main control section 3 for controlling the print section 2.

The main control section 3 comprises a CPU 4 for controlling the overall printer. A main memory 5 comprises a read-only memory (ROM), and stores an operation processing sequence (program), character pattern information, and the like. An expansion memory 6 comprises a rewritable large-capacity memory such as a hard disk drive, and can additionally store an emulation program, character pattern information, and the like. Furthermore, the expansion memory 6 can be attached/detached by a user. An input buffer 7 temporarily stores input data. An image generator 8 generates image data to be drawn. A bit map memory 9 develops bit map data of the image data. A shift register 10 converts parallel data into serial data, and outputs the serial data as a video signal to the print section 2.

In the above-mentioned arrangement, print data output from an external host computer 11 are stored in the input buffer 7 in the main control section 3. The CPU 4 sequentially analyzes print data in the input buffer 7, causes the image generator 8 to generate pixel unit information of a print image using pixel unit information of, e.g., characters stored in the main memory 5, and develops the generated information as image data for one page on the bit map memory 9. The CPU 4 sequentially transfers the image data to the shift register 10 to generate a video signal, and outputs the video signal to the print section 2. The print section 2 forms an electrostatic latent image on the electrostatic drum 106 by ON/OFF-controlling the laser beam 104 according to the input video signal.

Figure 3A:
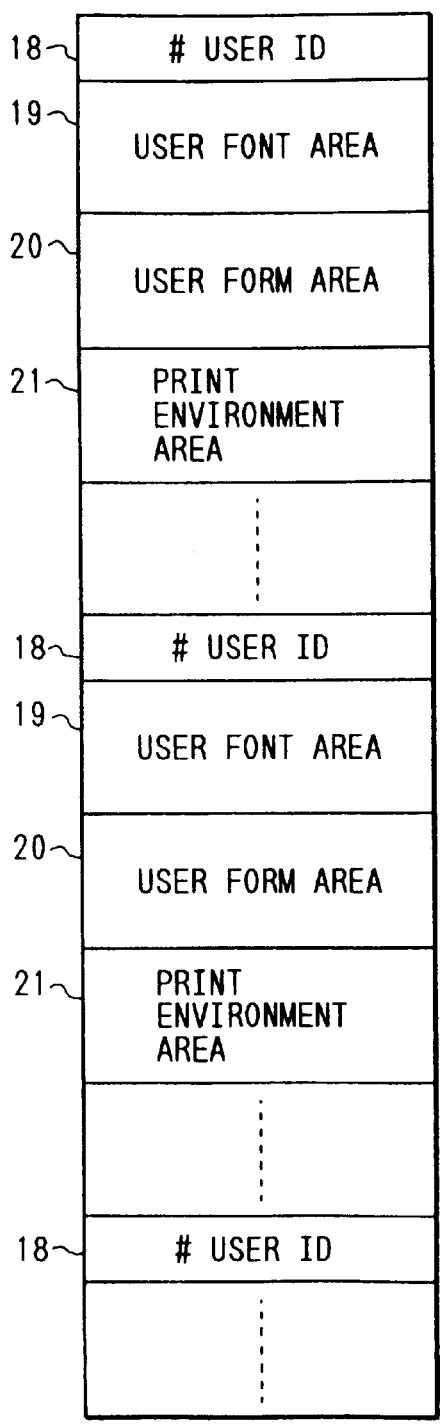
FIG. 3, consisting of FIGS. 3A and 3B, shows the formats of data stored in an expansion memory of the first embodiment.
Figure 3B:
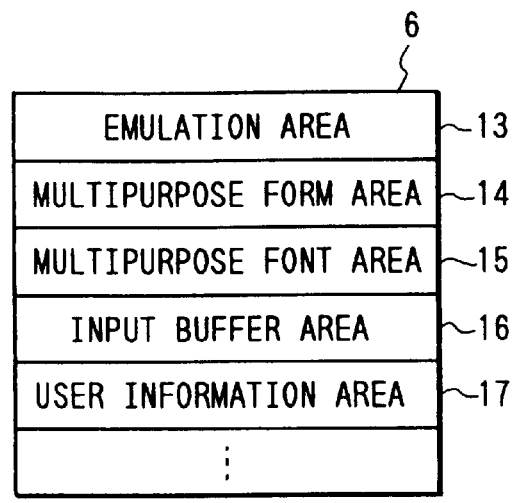

FIG. 3 shows the formats of data to be stored in the expansion memory 6. The expansion memory 6 is used for compensating for a memory element such as a RAM, a ROM, and the like in the main memory 5 of the main control section 3. More specifically, the expansion memory 6 has the following areas:

an emulation area 13 used for adding and assuring emulation programs;

a multipurpose overlay form area 14 used for adding and assuring multipurpose overlay forms;

a multipurpose font area 15 used for adding and assuring multipurpose character font patterns;

an input buffer area 16 as an auxiliary input buffer; and a user information area 17 used for adding and assuring user print environment information.

Furthermore, the user information area 17 includes a user ID 18, a user font area 19, a user form area 20, and a print environment information area 21. The user ID 18 is used for identifying a user, who inputs information. A user can register fonts and forms (e.g., forms with stamps or signatures) exclusively used by himself or herself in the user font area 19 and the user form area 20. The print environment information area 21 is an area for storing user print environment information, which designates multipurpose character fonts, multipurpose forms, an emulation program, and the like.

A series of processing operations in the above arrangement will be explained below.

Figure 4:
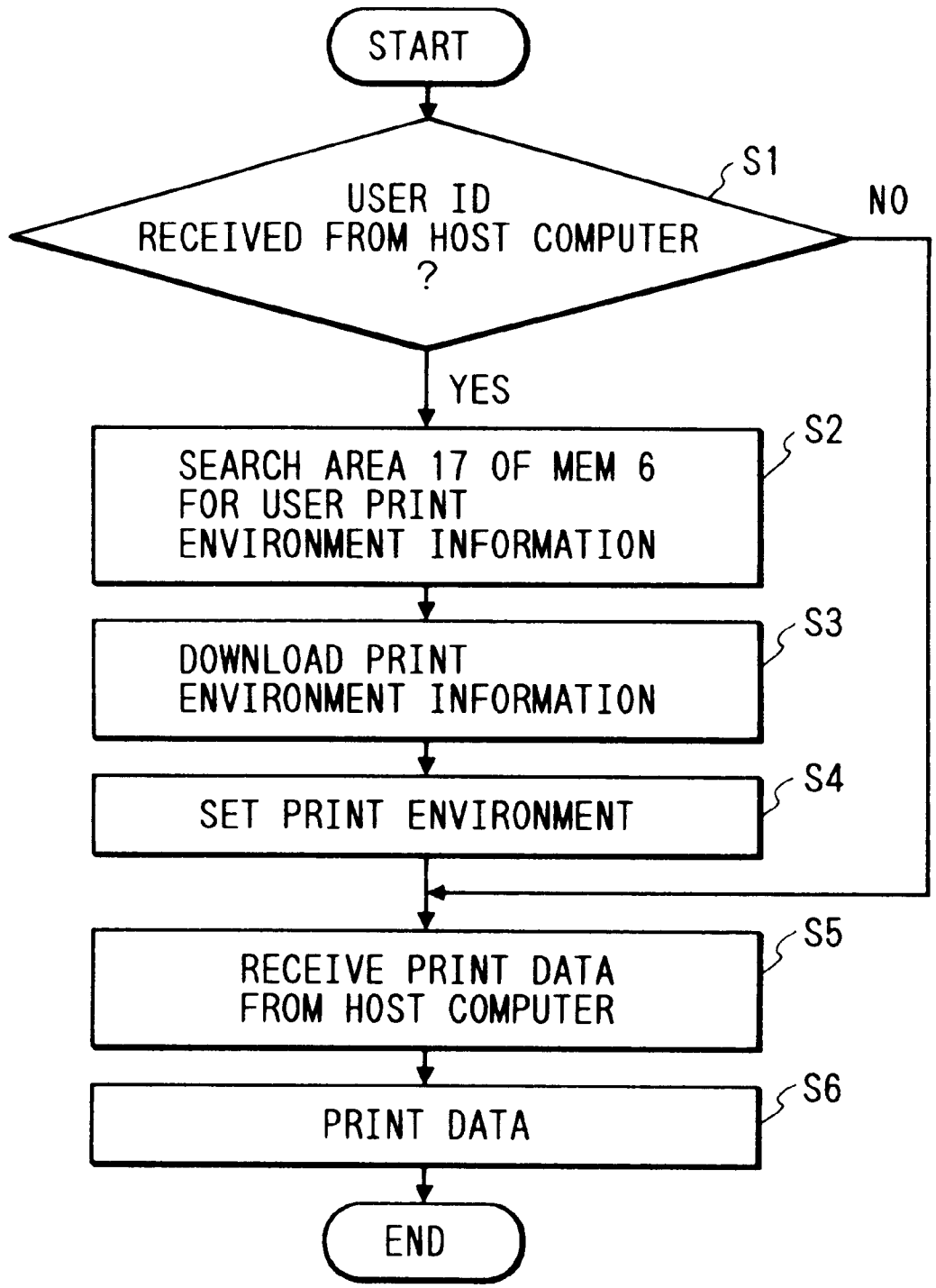
FIG. 4 is a flow chart showing a print environment setting operation according to the first embodiment.

FIG. 4 is a flow chart showing a print environment setting operation by the laser beam printer 1 of this embodiment.

When one of the plurality of host computers 11 transmits print data to the laser beam printer 1, it transmits a pre-registered user ID to the laser beam printer 1. When the CPU 4 receives the user ID in step S1, the flow advances to step S2. In step S2, the CPU 4 searches the user information area 17 in the expansion memory 6 to find out user print environment setting information corresponding to the received user ID. The flow then advances to step S3 to download an emulation program, character fonts, form data, and the like stored in the main memory 5 and the expansion memory 6 with reference to the print environment setting information found in step S2. In step S4, a print environment of the laser beam printer 1 is set. Thereafter, when the laser beam printer 1 receives print data from the host computer in step S5, the main control section 3 outputs video data to the print section 2 according to a predetermined program.

Each user need not always perform a print operation under the same print environment. That is, when no user ID is transmitted from the host computer, the flow jumps from step S1 to step S5, and the laser beam printer operates according to the current print environment.

When a user wants to add or rewrite print environment information, he or she designates a user ID via the host computer, and then transmits a command for a function of saving print environment setting information, thereby executing addition or rewriting of information.

Second Embodiment

Figure 5:
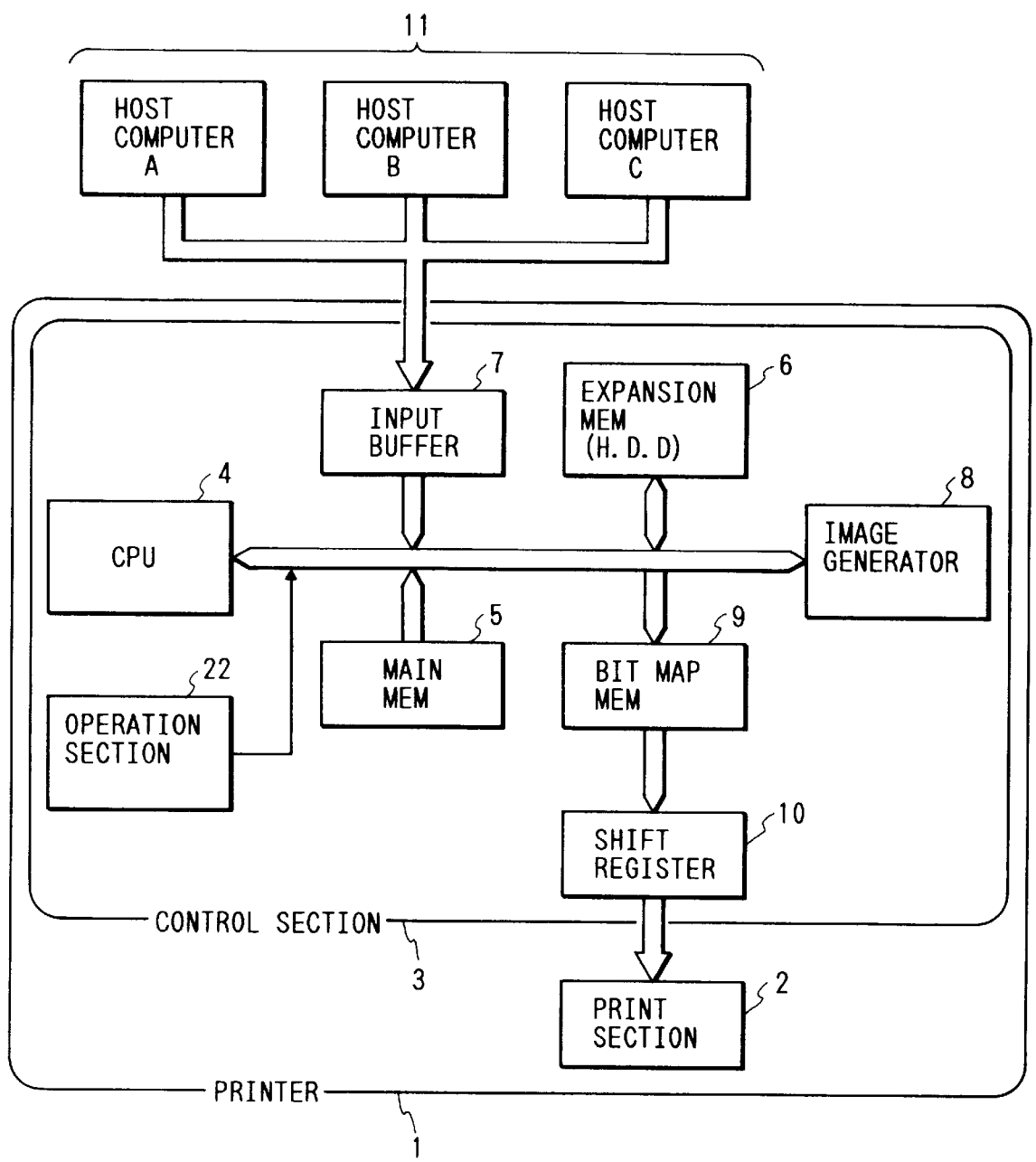
FIG. 5 is a block diagram of a laser beam printer according to the second embodiment of the present invention.

FIG. 5 is a block diagram of a laser beam printer according to the second embodiment of the present invention. The same reference numerals in FIG. 5 denote the same parts as in FIG. 2, and a detailed description thereof will be omitted. In FIG. 5, an operation section 22 is arranged in the laser beam printer, and can input various kinds of information including those to be stored in the user information area 17.

Figure 6A:
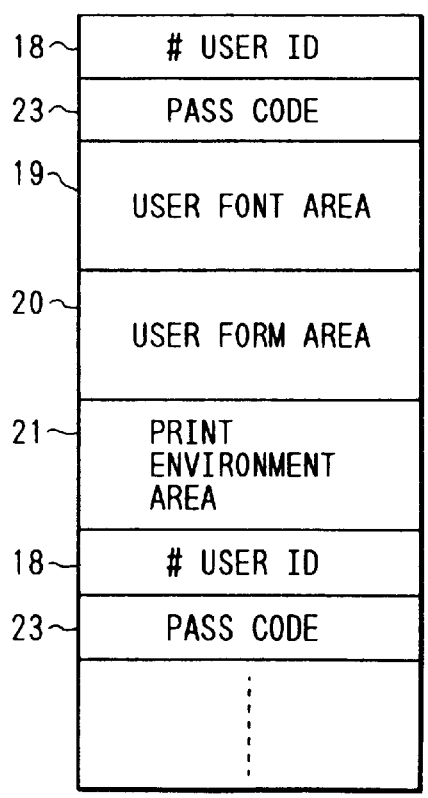
FIG. 6, consisting of FIGS. 6A and 6B, shows a memory map of an expansion memory of the second embodiment.
Figure 6B:
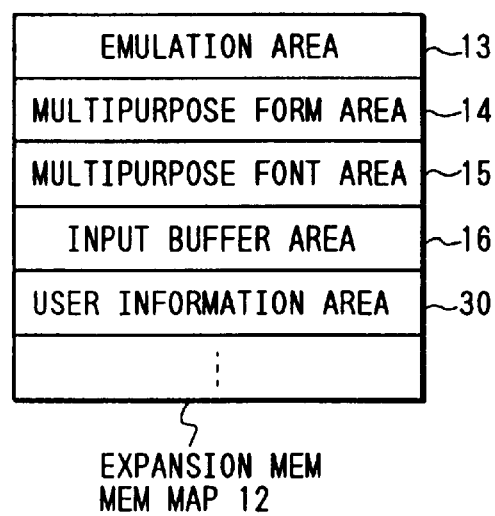

FIG. 6 shows the content of information stored in an expansion memory 6 in the second embodiment. The same reference numerals in FIG. 6 denote the same parts as in the first embodiment, and a detailed description thereof will be omitted. In FIG. 6, a user information area 30 includes a user ID 18, a user font area 19, a user form area 20, a print environment information area 21, and pass code information 23. When a pass code is set in the pass code information 23, only a user who set the pass code can access the user information area 30 in the expansion memory 6.

Processing operations will be described below. The processing operations upon execution of a print operation in the second embodiment are substantially the same as those in the first embodiment, except for operations to be described below.

When a user inputs the user ID 18 from the operation section 22, he or she can call a print environment without using the host computer. Similarly, a user can execute rewriting of stored user information. In this case, user font data 19 and user form data 20 must be supplied from the host computer. When a pass code 23 is added to the user information area 30, only a specific user can output registered print environment setting information. Therefore, the forms of, e.g., approval stamps, important documents, and the like can be stored in the expansion memory 6, so that a specific user can use these data.

As described above, according to each of the above embodiments, the laser beam printer main body comprises the large-capacity rewritable storage medium such as a hard disk drive, and the storage medium has an area for storing user print environment setting information. Thus, when a user uses the laser beam printer, a corresponding print environment can be immediately realized, thereby eliminating troublesome change operations of print environments when the laser beam printer is commonly used by a plurality of users (shared use).

Furthermore, according to the second embodiment, when a pass code is registered, forms of, e.g., approval stamps, important documents, and the like can be registered.

In each of the above embodiments, print environment setting information is managed on the basis of user IDs. However, the present invention is not limited to this. For example, print environment setting information may be stored in by document format name, so that the print environment setting information can be managed on the basis of document format.

In each of the above embodiments, the laser beam printer is used as a printer. However, the present invention is not limited to this. For example, any other printers, such as an ink-jet printer, may be used.

Note that the present invention may be applied to a system constituted by a plurality of devices, or may be applied to an apparatus consisting of a single device. Also, the present invention may also be applied to a case wherein the invention is achieved by supplying a program to a system or an apparatus.

As described above, according to the present invention, when a user uses a printer, a desired print environment can be set, thus eliminating troublesome change operation of print environments of the printer.

When a pass code is registered, forms of, e.g., approval stamps, important documents, and the like can be registered.

What is claimed is:

1. An output apparatus comprising:
   memory means for storing a plurality of pieces of print environment information in a specific area;
   reception means for receiving data including print data and/or a user ID;
   means for, when said reception means receives the user ID, reading out a desired piece of print environment information from said memory means in accordance with the received user ID, wherein the user ID includes a first ID and a second ID and the specific area of said memory means becomes accessible in response to the first ID and the desired piece of print environment information is read from said memory means in response to the second ID;
   means for setting print environment on the basis of the desired piece of print environment information read out by said reading means; and
   control means for, when said reception means receives the print data, controlling a print process of the received print data on the basis of the print environment which has been set by said setting means.

2. An apparatus according to claim 1, wherein said memory means is detachably connected to said output apparatus.

3. An apparatus according to claim 1, wherein the printing apparatus is shared by a plurality of host computers.

4. An apparatus according to claim 1, further comprising means for registering a piece of print environment information in the specific area of said memory means in response to an instruction from an external apparatus connected to said output apparatus or from an operation section provided in said output apparatus.

5. An apparatus according to claim 1, wherein the print environment information includes form information.

6. An apparatus according to claim 1, wherein said reception means receives the user ID in advance of the print data.

7. An apparatus according to claim 1, wherein said apparatus is a laser beam printer.

8. An output method for use in an output apparatus, comprising the steps of:
   storing, in memory means, a plurality of pieces of print environment information in a specific area;
   receiving data including print data and/or a user ID;
   when the user ID is received in said receiving step, reading out a desired piece of print environment information from the memory means in accordance with the received user ID, wherein the user ID includes a first ID and a second ID and the specific area of the memory means becomes accessible in response to the first ID and the desired piece of print environment information is read from the memory means in response to the second ID;
   setting print environment on the basis of the desired piece of print environment information read out in said reading step; and
   when the print data is received, controlling a print process for printing the received print data by means of a printing apparatus, on the basis of the print environment which has been set in said setting step.

9. A method according to claim 8, wherein the memory means is detachably connected to the output apparatus.

10. A method according to claim 8, wherein the printing apparatus is shared by a plurality of host computers.

11. A method according to claim 8, further comprising the step of registering a piece of print environment information in the specific area of the memory means in response to an instruction from an external apparatus connected to the output apparatus or from an operation section provided in the output apparatus.

12. A method according to claim 8, wherein the print environment information includes form information.

13. A method according to claim 8, wherein said receiving step includes receiving the user ID in advance of the print data.

14. A method according to claim 8, wherein the output apparatus is a laser beam printer.

15. A memory medium storing executable codes for causing a programmable apparatus to perform an output method for use in an output apparatus, said method comprising the steps of:
   storing, in memory means, a plurality of pieces of print environment information in a specific area;
   receiving data including print data and/or a user ID;
   when the user ID is received in said receiving step, reading out a desired piece of print environment information from the memory means in accordance with the received user ID, wherein the user ID includes a first ID and a second ID and the specific area of the memory means becomes accessible in response to the first ID and the desired piece of print environment information is read from the memory means in response to the second ID;

setting print environment on the basis of the desired piece of print environment information read out in said reading step; and when the print data is received, controlling a print process for printing the received print data by means of a printing apparatus, on the basis of the print environment which has been set in said setting step.

16. A memory medium according to claim 15, wherein the memory means is detachably connected to the output apparatus.

17. A memory medium according to claim 15, wherein the printing apparatus is shared by a plurality of host computers.

18. A memory medium according to claim 15, wherein said method further comprises the step of registering a piece of print environment information in the specific area of the memory means in response to an instruction from an external apparatus connected to the output apparatus or from an operation section provided in the output apparatus.

19. A memory medium according to claim 15, wherein the print environment information includes form information.

20. A memory medium according to claim 15, wherein said receiving step includes receiving the user ID in advance of the print data.

21. A memory medium according to claim 15, wherein the output apparatus is a laser beam printer.

22. A program product containing executable codes for causing a programmable apparatus to perform an output method for use in an output apparatus, said method comprising the steps of:

storing, in memory means, a plurality of pieces of print environment information in a specific area;

receiving data including print data and/or a user ID;

when the user ID is received in said receiving step, reading out a desired piece of print environment information from the memory means in accordance with the received user ID, wherein the user ID includes a first ID and a second ID and the specific area of the memory means becomes accessible in response to the first ID and the desired piece of print environment information is read from the memory means in response to the second ID;

setting print environment on the basis of the desired piece of print environment information read out in said reading step; and when the print data is received, controlling a print process for printing the received print data by means of a printing apparatus, on the basis of the print environment which has been set in said setting step.

23. A program product according to claim 22, wherein the memory means is detachably connected to the output apparatus.

24. A program product according to claim 22, wherein the printing apparatus is shared by a plurality of host computers.

25. A program product according to claim 22, wherein said method further comprises the step of registering a piece of print environment information in the specific area of the memory means in response to an instruction from an external apparatus connected to the output apparatus or from an operation section provided in the output apparatus.

26. A program product according to claim 22, wherein the print environment information includes form information.

27. A program product according to claim 22, wherein said receiving step includes receiving the user ID in advance of the print data.

28. A program product according to claim 22, wherein the output apparatus is a laser beam printer.

* * * * *